United States Patent Office 3,432,580
Patented Mar. 11, 1969

3,432,580
METHOD AND MEANS FOR PRODUCING FOAMED SILICATE ARTICLES
Walter Heidrich and Klaus Körner, Urach, Wurttemberg, Germany, assignors, by mesne assignments, to Synfibrit G.m.b.H. & Co., Urach, Germany, a corporation of Germany
Filed Jan. 13, 1966, Ser. No. 536,234
U.S. Cl. 264—43                               11 Claims
Int. Cl. B29d 27/08

ABSTRACT OF THE DISCLOSURE

Foamed silicates, such as foam glass, are produced by compressing a mixture consisting of small particles of silicate and foam producing substance, loading it upon an impermeable band and sintering the mixture while moving it through an oven, then exposing all outer surfaces of the sintered mass to outside air to facilitate gas removal and completing the foaming while shaping the mass.

---

Figure 1:
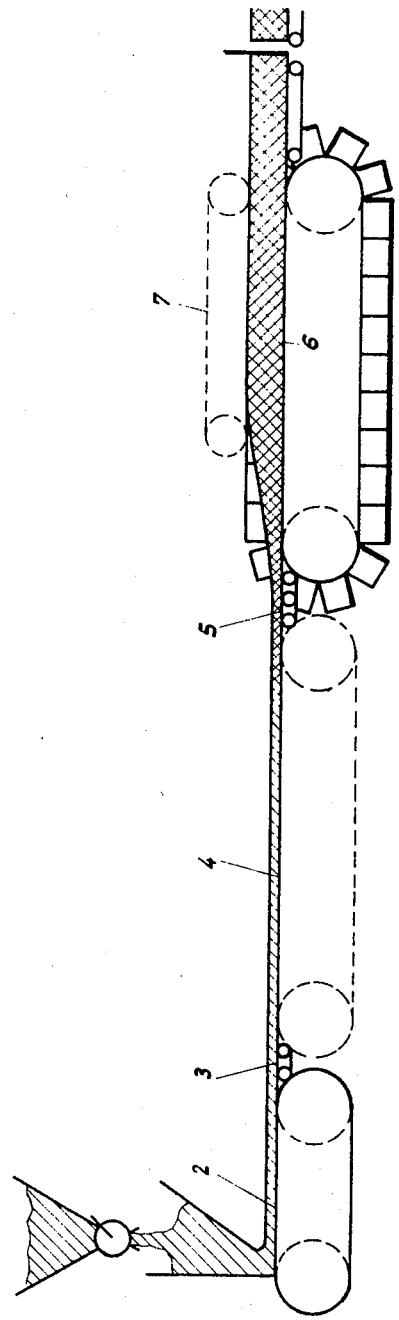

This invention relates to a method and means for producing foamed silicates and refers more particularly to a method of making foam glass by forming long-stringed articles upon a running board and to an apparatus for carrying out this method.

The foaming of glass is known in the art. The most extensively used procedure consists essentially in that glass which usually contains a sulfate residue capable of reduction, is comminuted to a very fine extent (to 50–80$\mu$) and is exposed jointly with a carbon-containing foaming substance to temperatures of about 600° C. to 70° C. The powder-like mixture sinters while being reduced in size and thereupon foams while the temperature is increased to 750° C. to 900° C. The foam formation is caused by the development of gas resulting from a reaction between carbon and sulfate residue, whereby gases, such as $SO_2$, $H_2S$, $CO$ and $CO_2$, are developed which have an expanding action upon the plastic glass masses at the foaming temperature.

It is also known to produce foaming by active means which do not react with the glass forming substances, for example, calcium carbonate, silicium carbide and others.

It has been also suggested that foam glass can be produced by a type of flow process in accordance with which binders are added to the comminuted initial substances and then pieces are shaped which are subjected to a heating process. However, this process results in the production of only weakly foamed articles which are used for polishing purposes.

According to another known process the manufacture of foam glass is carried out partly continuously. In the course of this process a vertically operating foaming unit is supplied with charges and is guided through an oven. However, the charge must be completely exposed on all sides during this procedure.

Heretofore a uniform foaming of larger blocks free of errors presented considerable difficulties. One attempt to solve this problem was based on the assumption that faults in the foam structure result from non-uniform contractions during the sintering phase. It was suggested that this could be overcome by the use of a glass powder-foaming substance mixture placed in forms and uniformly spread in a manner similar to that of a bar of chocolate. It was held, on the other hand, that the faults may result from an improper development of the heating procedures. It was, therefore, also suggested that structural faults could be eliminated by spaced sudden raises in temperature between sintering and foaming, for example, from 650°C. to 850° C.; this should have the effect of limiting these procedures relatively to each other and produce a greater uniformity in the foaming mass.

Yet another explanation has been offered according to which faults in the foaming mass are caused by gases collecting between the bottom of the form and the mass being foamed. Obviously, gas is formed wherever carbon and sulfate residue react with each other, that is, at the edges of the foaming mass as well. Consequently larger or smaller gas masses can be trapped between the sintered mass and the bottom of the form, or a closed edge thereof. A part of these gases penetrates into the plastic mass which becomes easier for such passage due to expansion caused by rise in temperature, whereby nests of gases are formed. Another part of the gases passes through the entire mass and forms volcano-like upcast portions; if there is a large amount of these gases, craters, whirl-like recesses and other surface deviations are produced.

It has been suggested already to provide small openings in the corners and in the middle of the bottom of the form so as to provide an escape for these gases. However, these openings are usually stuffed at the time the form is filled with powder which sinters later on. The desired escape of gases does not take place even if the openings are cleaned after each charging.

An object of the present invention is to eliminate the drawbacks of prior art methods.

Another object is to provide a real continuously moving band process and apparatus for making foamed silicates.

Other objects of the present invention will become apparent in the course of the following specification.

In the course of the accomplishment of the objectives of the present invention it was found that one of the main causes for the faults in the foam structure can be effectively eliminated by providing a removal of gases from the foam mass at the correct time and from all sides.

Foaming free from faults is the required prerequisite for a fully continuous running band process for producing foamed silicates which, along with the apparatus for carrying out the process, is the main subject of the present invention.

As already stated, the process of the present invention is concerned with the production of foamed silicates upon a running band following the principle of track shaping. According to the proces a shaken in mass in powder form or consisting of small pieces, said mass consisting of a mixture of silicate and a foaming substance which may be preliminarily compressed or presintered, is guided through an oven and is sintered there into a single mass; in this state it is open for a while on all its outer surfaces, particularly upon its supporting surface and immediately thereafter it is finally foamed if necessary at an increased temperature between limiting form walls which are moved with the mass. Then the finally foamed mass is quenched for a short while, i.e. the temperature is quickly dropped to close to the softening point which lies between 450° C. and 550° C. This fixes the flat or profiled outer surface. Then the mass is cut up and the formed articles thus produced are slowly cooled.

The process can be carried out in one or several ovens through which the bands are moved. Glass is preferably used as the silicate.

The sticking of the foam material to the transporting means is prevented by the use of a separating layer, having, for example, a clay base.

The steps of the process of the present invention are so carried out that initially a mixture of silicate, or glass, and a foaming substance, which can be in powder form or consist of small particles and which may consist of a preliminarily sintered or preliminarily compressed mixture of silicate and a foaming substance, is shaken upon the first section of a transporting device and is then heated to the sintering temperature, for example, to 750° C., or higher, if desired; the temperature may be 850° C. without causing any detrimental aftereffects.

The first transporting section may be designated as the loading band, since it consists of a transporting band with a closed surface which may have small side walls. As soon as the initial material is sintered in the further course of the heat treatment and as soon as gases begin to develop thereafter, the following transporting section, which may be described as the gas removing band, provides for a free removal of the gases. This is accomplished in practice in that, for example, a gas-transmitting transporting band, consisting for example of several joined sections, or provided with perforations, or consisting of a mesh, is placed at the end of the loading band. Instead of the gas-pervious band, the gas removing section may be provided with a series of transfer rollers or pulleys which facilitate gas removal through the intermediate spaces at the lower part of the sintering mass.

According to another embodiment of the present invention the removal of gases can be facilitated by providing movable beams instead of or in addition to the rollers, or by removing the transporting means once or several times for a short while from the mass being transported, by pulling them, or bending them, or guiding them away from the mass.

Finally according to a further embodiment of the process of the present invention it is possible to provide in the gas removing section a transporting member having the shape of an air cushion which can be used by itself or in any desired combination with the previously described means, whereby the supporting air absorbs totally or partly gases escaping from the lower surface of the sintering mass.

The gas removing section extends advantageously to the location wherein the material begins to visibly increase its volume as the result of foaming. The actual foaming, or at least its final phase, takes place in the section following the gas removing section and designated herein as the foaming section, upon a further preferably closed band. During the final phase of the foaming when the volume is greatly increased, the final form is imparted to the mass carried by the band by shaping elements engaging it from all sides and movable along with it. It should be noted that an important feature of the present invention is the application of shaping surfaces from all sides only in the last foaming phase.

The two heating phases of the process of the present invention can be carried out at any desired suitable temperatures. Since the present invention provides a careful removal of the gases during the sintering and during the beginning of the foaming, this invention makes it possible when glass is used as the silicate, to apply the same temperature during the sintering phase and the foaming phase. This constitutes a substantial improvement over prior art processes, wherein it was necessary to increase the temperature after the sintering and during the foaming.

An apparatus constructed in accordance with the present invention, which can be used for making foamed silicates, particularly foamed glass, by passing them through one or several ovens, consists of a series of transporting elements, namely a first impermeable plate band as the loading band, which is followed by a gas-permeable band, such as a perforated band, a mesh band or a band consisting of several joined parts. It is followed by another substantially impermeable band with high sides upon which the foaming takes place. During at least the last part of the foaming a preferably light upper band with fine joined parts, is used for the upper shaping of the foamed mass.

The arrangement of the transmitting rollers or pulleys between the above-mentioned bands serves not only for the purpose of transmitting the mass from one band to the other, but is also used advantageously for removing gases from the under surface of the sintered mass.

According to a further embodiment of the present invention the composition of the sintered mass permits the replacement of the perforated gas-removing band by a row of driven transmitting rollers located between the loading band and the foaming band.

According to a further embodiment of the present invention the gas removal from the under section can be carried out by a short withdrawal, bending or removal of the transmitting means, for example, by the provision of a movable beam or a step-back device between the loading band and the band wherein foaming takes place. It is also possible to provide between these bands a transporting device shaped as an air cushion, whereby the supporting air receives totally or in part the gases escaping from the bottom section of the sintering mass.

The above devices which can be used in accordance with the principles of the present invention, can be employed individually or in any desired combination to improve the removal of gases from the lower section of the sintered mass between the loading band and the band wherein foaming takes place.

All mechanically operating transporting elements, bands, rollers, etc. can be provided with a coating which prevents adhesion, such as a clay coating, in a manner known per se.

The apparatus of the present invention includes a loading band which extends over about ¼ to ⅓ of its entire length, a gas-removing device which extends over about ⅓ to ½ of the entire length and a foam-carrying band extending over ⅓ to ¼ of the total length. The upper limiting band of the foaming section is preferably located in the last quarter to one sixth of the total length of the device.

A transfer lock device is located behind the foam-carrying band in a manner known per se; it includes devices for dividing the foaming flow and for the transmission to a following cooling band. This device is heated and the temperatures are preferably very close to the softening range of the silicate.

A cutting disc is used for the separation of the foamed mass, the disc being located outside of the transmitting device; however, the temperature of the interior of the cutting section of the disc is close to the temperature of the transmitting device. The cutting disc has an excellent effect during the cutting procedure. Since the cutting takes place when the interior of the foamed mass is still heat glowing a certain quenching effect takes place which results in a quick solidification of the separated surfaces.

Surfaces tempered in this manner provide increased resistance to the tendency to sink resulting from the joint effect of the contraction of gases during cooling in each of the many cells of the foam body, so that all subsequent treatments can be eliminated. Furthermore, after cutting a type of vitreous surface skin is formed which has the advantage of greater mechanical resistance and of complete imperviousness to moisture as compared to treated surfaces.

A particular advantage of the present invention is that it makes possible a rational manufacture of foam silicate masses which are free of faults, in a continuous manner. By way of example, the present invention will produce most effectively profiled parts in a continuous process. In particular, it is possible to produce pipe covers consisting of two half shells of foam glass which are most valuable due to their high insulation against heat resistance to change in heat transmission values caused by moisture influences and resistance against chemicals.

In prior art very complicated or expensive manufacturing methods had to be used to produce such parts, namely, either a special form was used to make each shell in a most complicated manner, or the shell was made by being cut out of blocks or plates with a substantial loss of material.

On the other hand, to produce such insulating half shells in accordance with the present invention it is merely necessary to provide additional parts to the supplying device at the loading band and the foam-carrying band. Outside of that, the same apparatus can be used which makes elongated parts with rectangular cross sections. The loading and gas-removing bands remain unchanged.

The process and the apparatus of the present invention are used for the manufacture of foamed silicates, for example, foam quartz, foam glass or foam water glass.

The invention will appear more clearly from the following detailed description, when taken in connection with the accompanying drawing showing by way of illustration only, some of the preferred examples of the present invention which relate to the manfacture of foam glass.

In the drawing:

Example 1.—Manufacture of formed parts with flat surfaces

As initial material a known mixture is used which has been thoroughly mixed and which consists of finely comminuted glass powder (50 to 80$\mu$) with 0.1 to 1% soot.

Figure 2:

This mixture is shaken upon a continuously powder weighing scale 1 which assures a uniform layer of the mixture and transmits it to a loading band 2 which, by way of example, consists of a plate-like band with low side walls (FIG. 2); the height of the side walls should be equal to at least 1/8 of the maximum height of the foam layer. The length of this first band amounts to about 1/4 to 1/3 of the length of the entire apparatus. During this stretch the powder is heated and begins to sinter. The thickness of the layer is diminished and it also contracts in other ways, for example, the layer is torn and cracked into nonuniform layers which, however, substantially hang together. The temperatures in this section of the oven through which the band passes, amount, for example, to about 750° C.

Up to the time the material leaves this first transporting section of the apparatus, it has been transformed into a mass which holds together, which is plastic and shapable, although at a late stage it does present non-uniform cracks. This mass can be easily moved to the second section of the apparatus, namely, it can be placed upon a band having perforations or consisting of interconnected elements. This transfer takes place by a transmitting device 3, consisting, for example, of rollers and the like.

The second section of the apparatus contains a gas transmitting band 4. This band occupies about one third to one half of the total transporting length.

It is followed by the actual foaming section 6 which occupies 1/3 to 1/4 of the entire length of the apparatus and which is connected with the gas removing section by a transmitting device 5 which is similar to the transmitting device 3. Usual temperatures are used in the foaming zone which differ depending upon the composition of the glass and which may be approximately within the range of 780° C. to 900° C. However, it is preferable to use in the foaming zone the same temperature as in the sintering zone.

Figure 3:
Figure 4:
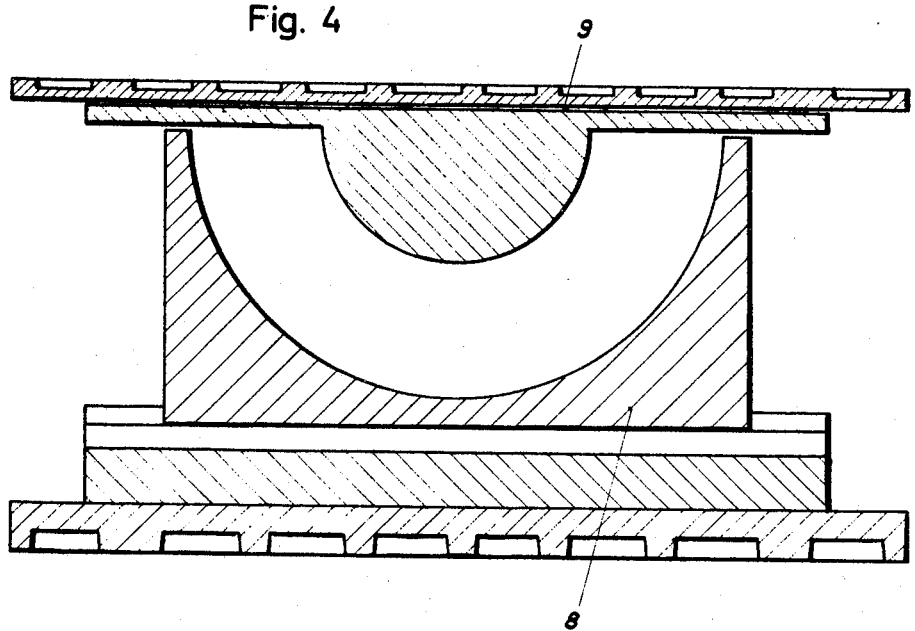

Only the foaming section, namely, about 1/4 of the entire transporting length, has bands with high side walls which may be removed and exchanged (FIG. 3). Again only a part of the foaming section contains upper forming means extending over the last quarter to the last one sixth of the entire length, wherein the foam mass is blown up to the entire extent. These upper forming or shaping means consist preferably of a light band 7 composed of fine joined parts.

Then the foam mass is introduced into a transfer lock which contains means cutting the foam mass as well as means transporting it upon a cooling band. The transmitting device is heated and the temperatures lie close to the softening range of the glass at about 550° C.

A cutting disc used for the cutting of the foam mass is located outside of the transfer lock although its cutting edge is located within the device and gets a temperature which is close to the temperature of 550° C. of the device.

In the cooling channel terminating the apparatus the cut off sections are cooled in the known manner from 550° C. to room temperature. The duration of the cooling depends upon the thickness of the cuts and in case of foam pieces having a height of about 15 cm., it continues for a maximum of 15 hours. Preferably the cut pieces are placed upright so as to save in the width of the band. Furthermore, then the cooling is better than in the case of lying blocks. The relatively quick cooling in the transmitting device and the strengthening of the outer surface which is combined therewith, eliminate, as a rule, any final cutting. When the height of the foaming mass is very great, the contraction of gases inside the mass can produce a drop in one of the two large surfaces of the foam block and then it is necessary to make that surface even. This surface is then advantageously used as the reference surface if it is desired to use this section of the highly foamed block in plates or the like.

Example 2.—Manufacture of half shells for pipe covers

The mixture is shaken upon a receiving band 2 and the thickness of the dosage is adapted to the diameter of the cup to be produced. A normal plate band is otherwise used with a substantially closed flat outer surface. The gas removing band 4 corresponds to that described in Example 1. The foam band 6 consists of a lower trough-like band 8 and an upper shaping band with a counter profile 9. The width and the height of the mixture which is shaken upon the band 2 are so selected that the foam fills the space formed by the molding band 8 and the counter profile 9. During foaming the linear expansion is about six times that of the initial powder, while the volume expansion is about twelve to fifteen times.

By way of example, in order to produce an insulating half shell having an inner diameter of 50 mm. and a wall thickness of 25 mm. it is necessary to apply a flow of the glass powder soot mixture which is 80 mm. wide and which forms a layer of 5 mm. thickness upon the receiving band. After sintering and the removal of gases, a strip which is about 75 mm. wide moves into the mold having a width of 100 mm., while the counter profile band constitutes a limit for the interior of the cup. In the transmitting device between the foam-carrying band and the cooling band, the cup being molded receives the desired dimensions at a temperature of about 550° C. Subsequent treatments are not necessary. The articles thus produced have a vitreous outer and inner skin which is impervious to steam.

What is claimed is:

1. A process for producing foamed silicates comprising compressing a mixture consisting of small particles of a silicate and a foam-producing substance, sintering said mixture while moving it through at least one oven to form an elongated mass, temporarily exposing all outer surfaces of said mass, including its bottom surface, to outside air to facilitate gas removal and completing the foaming between shaping walls movable along with the mass.

2. An apparatus for producing foamed silicates, particularly foam glass, comprising a substantially impermeable loading band device, a gas permeable transporting device which follows said loading band and a foam-forming device which follows said transporting device and which comprises means movable along with a foaming article to shape the article.

3. An apparatus in accordance with claim 2, wherein said transporting device consists of a perforated band.

4. An apparatus in accordance with claim 2, wherein said transporting device consists of a band composed of a plurality of joined sections.

5. An apparatus in accordance with claim 2, comprising means adapted to form an air cushion located between the loading band device and the foam-receiving band device for transporting the article being foamed.

6. An apparatus in accordance with claim 2, wherein said foam-carrying band device comprises a band and removable and replaceable side walls carried by said band.

7. An apparatus in accordance with claim 2, comprising article-transferring means located between the said devices and comprising transferring rollers.

8. An apparatus in accordance with claim 7, comprising means located between the loading band device and the foam-forming device for temporarily removing the article being foamed from its supporting surface.

9. An apparatus in accordance with claim 7, wherein said transporting device comprises rollers located between the loading band device and the foam-forming device.

10. An apparatus for producing foamed silicates, particularly foam glass, comprising a substantially impermeable transmovable loading band, a gas permeable movable transporting device constituting a continuation of said loading band, another band for carrying an article being foamed and constituting a continuation of said transporting device and an article-shaping band extending above a portion of said other band and movable therewith.

11. An apparatus in accordance with claim 10, wherein said loading band extends over ¼ to ⅓ of the total length of the apparatus, said total length consisting of the sum of the length of the loading band, the transporting device and said other band, wherein said transporting device extends over ⅓ to one half of said total length, wherein said other band extends over ⅓ to ¼ of said total length and wherein said article-shaping band extends over the last quarter to last one sixth of said total length.

References Cited

UNITED STATES PATENTS

| 2,255,236 | 9/1941 | Willis. |
| 2,310,457 | 2/1943 | Owen _____ 264—44 XR |

FOREIGN PATENTS

| 23,719 | 12/1961 | Japan. |
| 918,190 | 2/1963 | Great Britain. |

PHILIP E. ANDERSON, *Primary Examiner.*

U.S. Cl. X.R.

264—125; 106—40; 65—22, 141; 18—4, 5